United States Patent
Pun et al.

(10) Patent No.: US 8,451,956 B2
(45) Date of Patent: May 28, 2013

(54) SNR-BASED BLANKING SCHEME FOR IMPULSIVE NOISE MITIGATION IN WIRELESS NETWORKS

(75) Inventors: Man-On Pun, Cambridge, MA (US); Chunjie Duan, Medfield, MA (US); Zafer Sahinoglu, Arlington, MA (US); Dirk Brinkman, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 165 days.

(21) Appl. No.: 12/650,410

(22) Filed: Dec. 30, 2009

(65) Prior Publication Data

US 2011/0158360 A1  Jun. 30, 2011

(51) Int. Cl.
  *H04B 1/10* (2006.01)
(52) U.S. Cl.
  USPC .......................................... 375/341; 375/346
(58) Field of Classification Search
  USPC ................. 375/341, 148, 260, 340, 350, 316, 375/346; 714/794; 455/63.1, 222, 277.2, 455/278.1
  See application file for complete search history.

(56) References Cited

U.S. PATENT DOCUMENTS

| | | | | |
|---|---|---|---|---|
| 6,426,983 | B1* | 7/2002 | Rakib et al. | 375/346 |
| 2004/0156441 | A1* | 8/2004 | Peeters et al. | 375/260 |
| 2007/0009011 | A1* | 1/2007 | Coulson | 375/144 |
| 2007/0280097 | A1* | 12/2007 | Yang et al. | 370/206 |
| 2008/0181323 | A1* | 7/2008 | Waters et al. | 375/260 |
| 2008/0273630 | A1* | 11/2008 | Mege et al. | 375/341 |
| 2009/0125793 | A1* | 5/2009 | Kishigami et al. | 714/794 |
| 2009/0147890 | A1* | 6/2009 | Lee et al. | 375/341 |
| 2009/0245442 | A1* | 10/2009 | Siddharth et al. | 375/347 |
| 2010/0189199 | A1* | 7/2010 | Lou et al. | 375/341 |

OTHER PUBLICATIONS

Sergey V. Zhidkov, "Performance Analysis and Optimization of OFDM Receiver with Blanking Nonlinearity in Impulsive Noise Environment", Samsung Electronics, IEEE, 2006.*

* cited by examiner

*Primary Examiner* — Aristocratis Fotakis
(74) *Attorney, Agent, or Firm* — Dirk Brinkman; Gene Vinokur (57) ABSTRACT

A blanking scheme for mitigating impulsive noise in wireless networks is based on the signal-to-noise ratio (SNR) of symbols. To fully gain the benefits of the SNR-based blanking scheme, two methods are developed, namely a multi-level thresholding scheme in the time-, spatial- and frequency-domains, and a weighted-input error-correction decoding. The symbols are conditioned as a function of the estimated SNR in time-, frequency-, or spatial-domains or combinations therefore, and the conditioning is applied to an amplitude, phase, or energy level, or combinations thereof.

9 Claims, 12 Drawing Sheets

SNR-BASED BLANKING SCHEME FOR IMPULSIVE NOISE MITIGATION IN WIRELESS NETWORKS

FIELD OF THE INVENTION

This invention relates in general to wireless communication systems, and in particular to methods and systems for mitigation of impulsive interference to achieve reliable wireless communication in Orthogonal Frequency Division Multiplexing based wireless systems.

BACKGROUND OF THE INVENTION

Wireless networks, and particular wireless networks in industrial environments are susceptible to impulsive noise generated by electric equipment. This impulsive equipment noise is commonly characterized by a short duration and high power spike when compared to a desired signal. Thus, the impulsive noise incurs a sudden decrease in instantaneous SNR, which may lead to data packet loss and subsequently poor network performance. Despite the fact that data packet loss can be alleviated by retransmissions, such retransmissions induce delays, which is rather undesirable for wireless industrial networks with stringent delay constraints.

Furthermore, the high-power impulsive noise is particularly detrimental to orthogonal frequency division modulation (OFDM)-based wireless industrial networks. An OFDM block comprises multiple symbols and the whole block has to be jointly demodulated in the receiver to recover the transmitted symbols. As a result, even if short-duration impulsive noise is added to a few symbols, the high-power impulsive noise will be propagated over the entire block after joint demodulation, thereby the entire block, rather than only a few symbols, has to be retransmitted.

Figure 1:
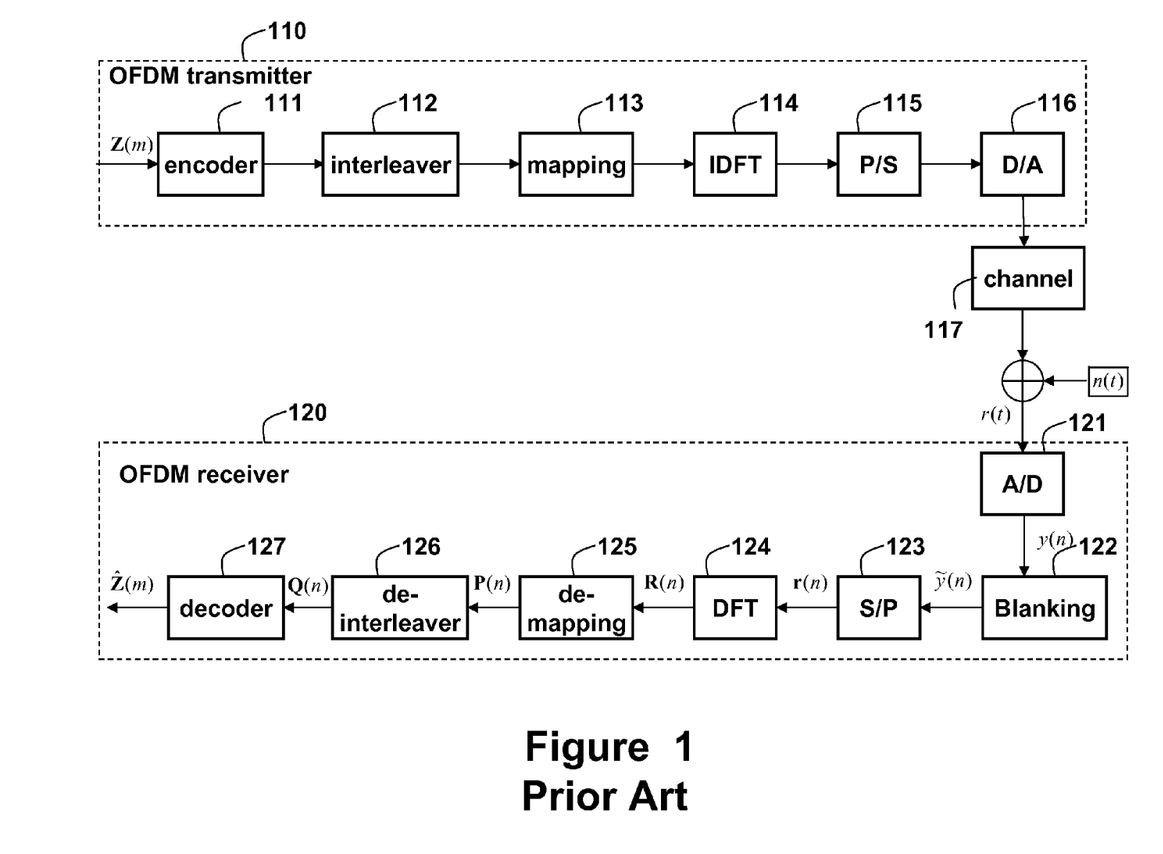
FIG. 1 is a block diagram of a prior art OFDM system having a receiver equipped with a prior art blanker.

FIG. 1 shows the schematic diagram of a conventional OFDM system including a transmitter 110 and a receiver 120. In the transmitter, a signal z(m) is encoded 111, interleaved 112, mapped 113, inverse discrete Fourier transformed 114, parallel-to-serial converted 115, analog-to-digital converted 116, and transmitted on a channel 117 subject to noise n(t).

In the receiver, the received signal r(t) is analog-to-digital converted 121, and blanked 122. Then, the signal is serial-to-parallel converted 123, discrete Fourier transformed 124, de-mapped 125, de-interleaved 126, and decoded 127 to recover $\hat{z}(m)$.

In the prior art, a noise blanker protects a signal processing circuit from unwanted noise spikes by interrupting the signal path when the noise exceeds a predetermined threshold or reference level, see U.S. Pat. No. 4,479,251 "Noise blanker."

Figure 2:
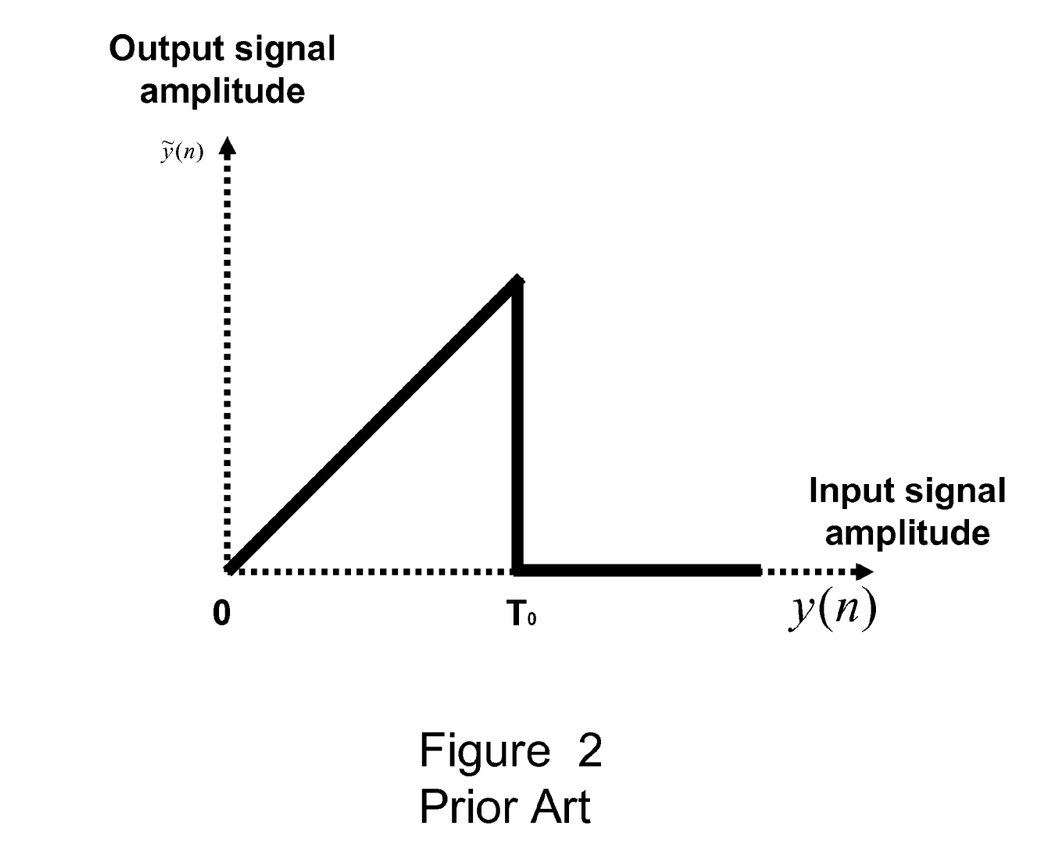
FIG. 2 is a schematic of a prior art amplitude-based single threshold for the blanker of FIG. 1.

To cope with the impulsive noise, the blanking 122 is applied. The conventional blanking is characterized by single threshold based on only the amplitude of the received signal y(n) as shown in FIG. 2. In addition, the conventional blanking can only decrease the amplitude to zero.

As shown in FIG. 2, the amplitude of each sample of data symbol y(n) is first compared with a pre-defined threshold T0. If the amplitude is larger than the threshold, then the prior art method blanks the corresponding $n^{th}$ sample of the data symbol y(n) by setting the signal to zero and no other value. Otherwise, the blanker will simply output the sample without change.

SUMMARY OF THE INVENTION

The embodiments of the invention provide a method for mitigating impulsive noise in wireless networks. The method noise mitigation is based on the signal-to-noise ratio (SNR). In contrast to the conventional blanking scheme, wherein the signal amplitude is used for blanking decision, the blanking scheme according to the invention makes a blanking decision by using the estimated SNR of each received symbol.

The invention is motivated by the fact that the signal SNR is a more accurate quality metric than the signal amplitude. To fully gain the benefits of the SNR-based blanking scheme, two embodiments are developed, namely a multi-level thresholding scheme, and a weighted-input error-correction decoding.

It should be emphasized that this blanking scheme is applicable to any wireless networks, regardless of their modulation schemes, e.g., single-carrier or multi-carrier.

It should also be noted that the weighted-input error correction decoding and the blanking method can be used independently.

DETAILED DESCRIPTION OF THE PREFERRED EMBODIMENTS

Figure 3A:
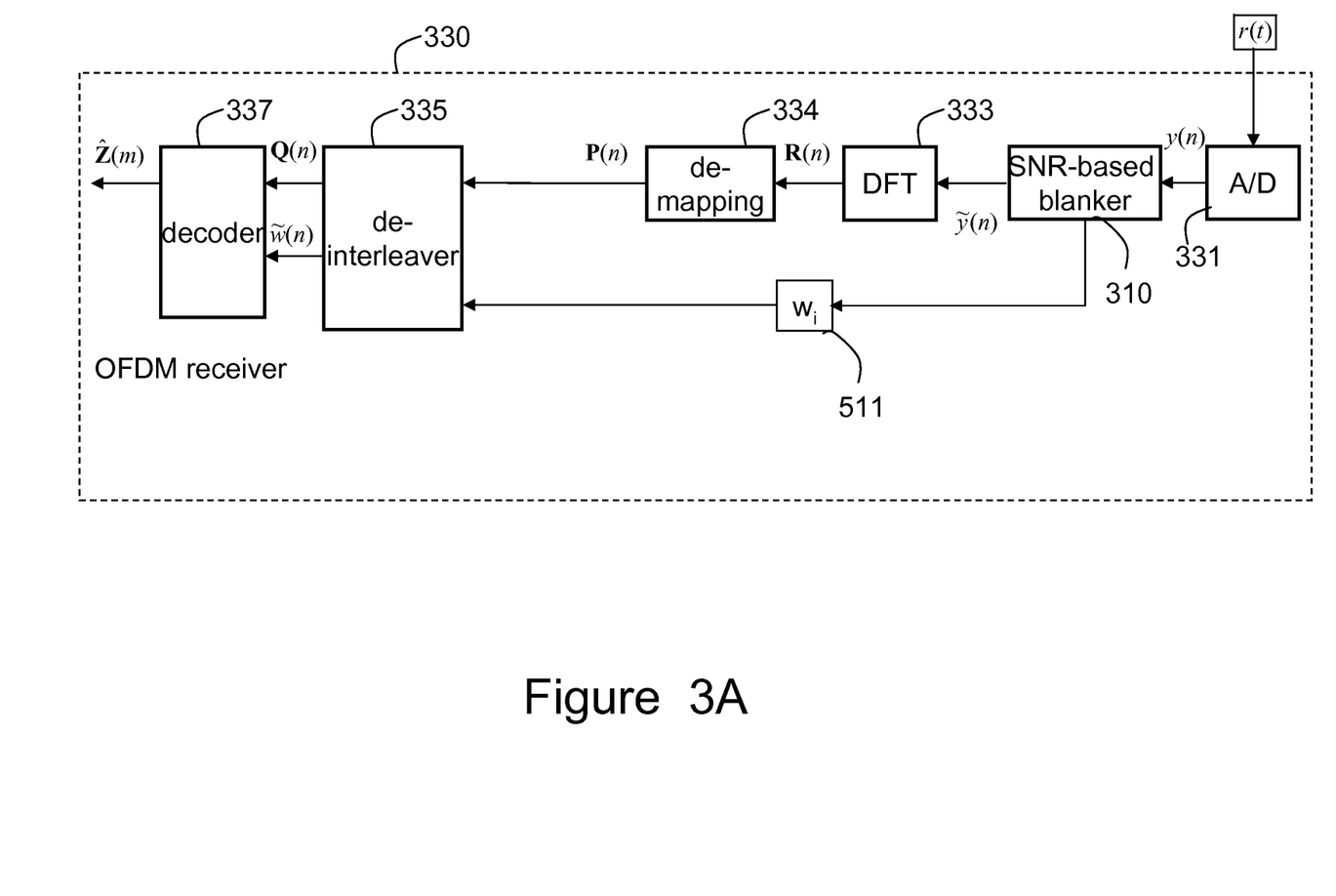
FIGS. 3A-3B are block diagrams of a receiver with a blanker according to embodiments of the invention.
Figure 3B:
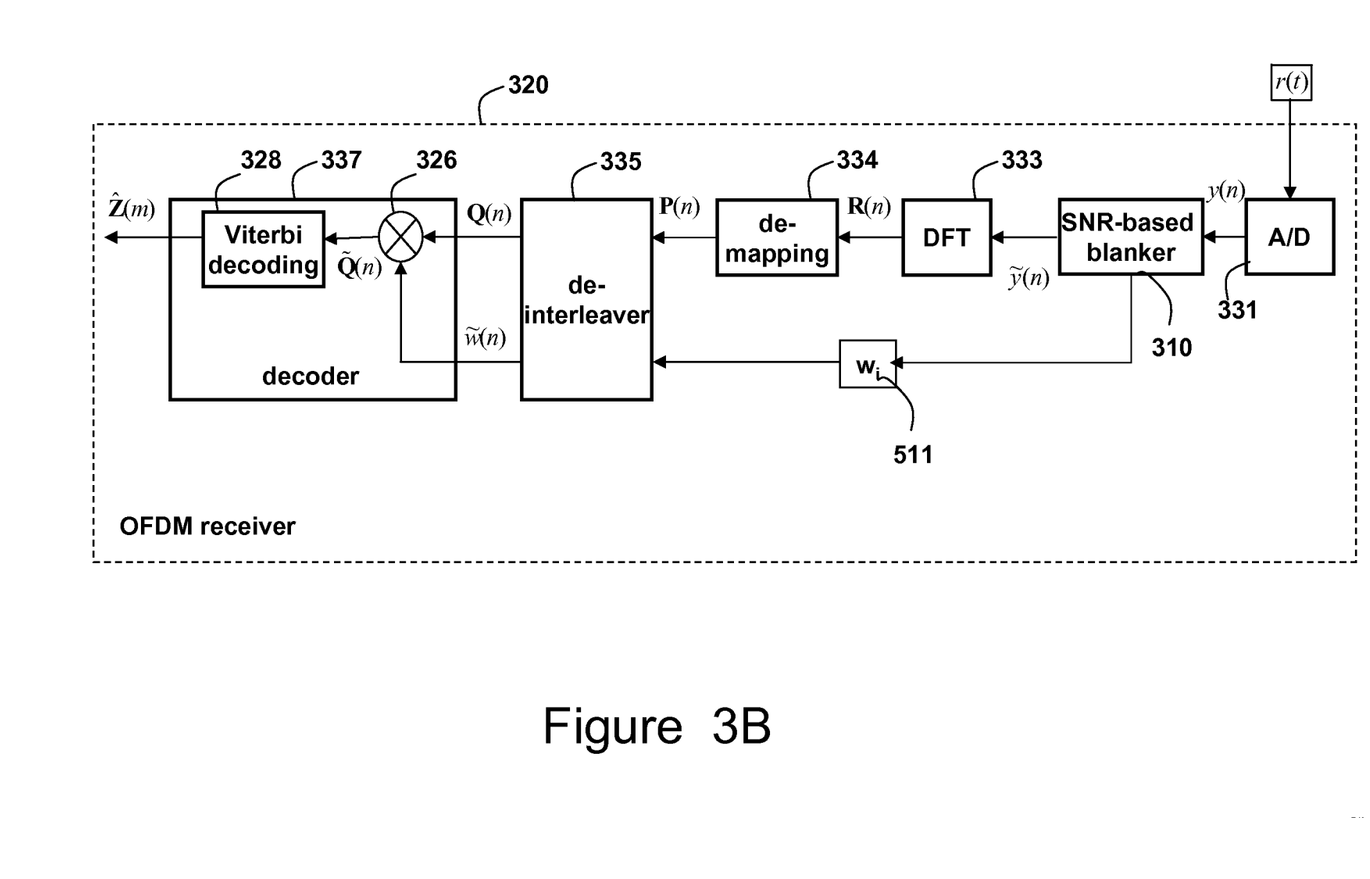

FIGS. 3A-3B shows a receiver 330 according to embodiments of our invention. A received signal r(t) is analog-to-digital converted 331, and blanked 310. Then, the signal is serial-to-parallel converted, discrete Fourier transformed 333, de-mapped 334, de-interleaved 335, and decoded 337 to recover a signal estimate $\hat{z}(m)$.

More specifically, the receiver first samples the received signal r(t) in the discrete time-domain before feeding the digitized data to the SNR-based blanker 310.

Figure 4:
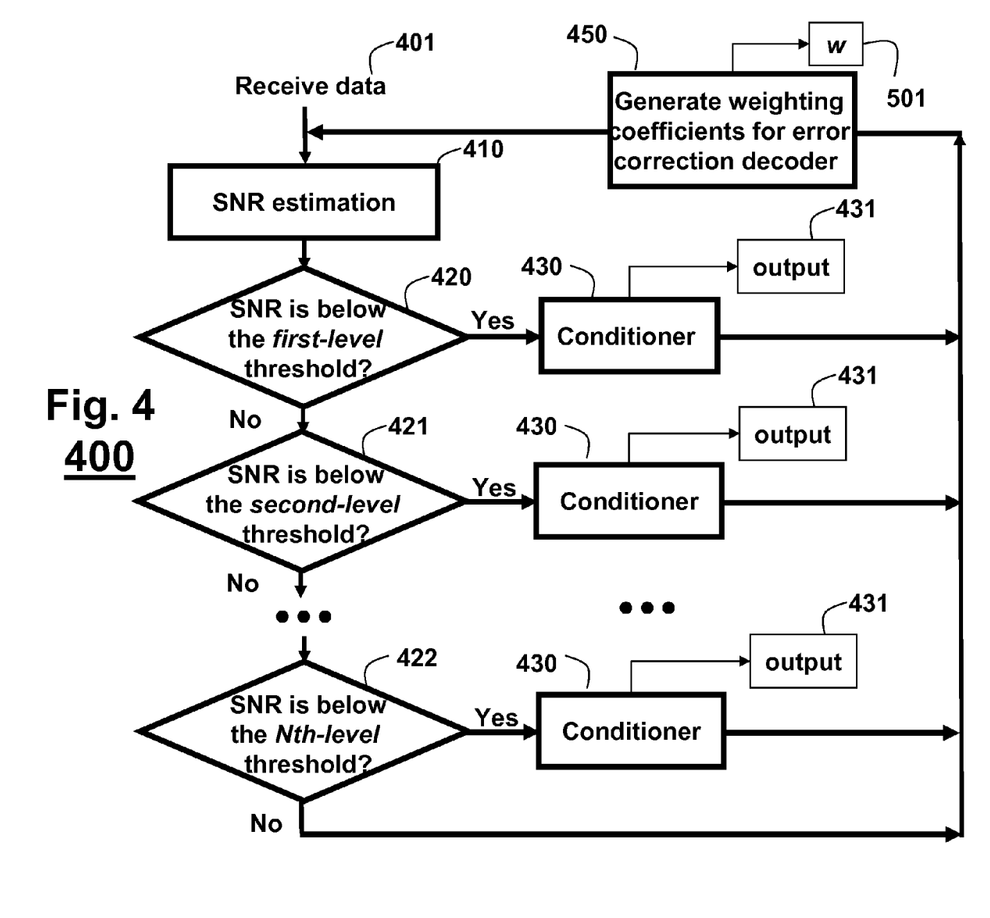
FIG. 4 is a schematic of an operation of the blanker with a multi-level threshold according to embodiments of the invention.

The detailed functional structure and operation of the SNR-based blanker 310 is shown in FIG. 4. For each received symbol 401 fed into the blanker 310, our blanker 310 first estimates 410 the SNR.

Figure 5:
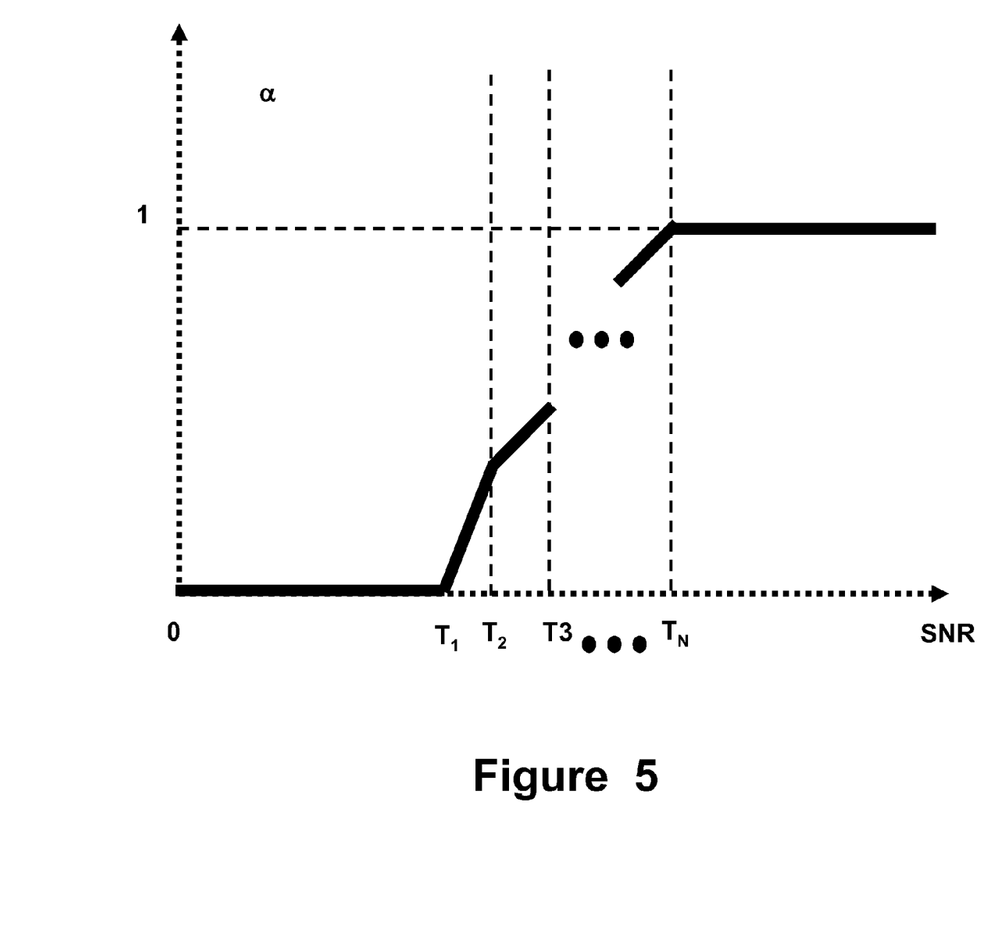
FIG. 5 is a schematic of the input-output relation of a conditioner of FIG. 4 with a multi-level threshold function according to embodiments of the invention.

Next, the estimated SNR is compared 420, 421 and 422 against a first-level threshold $T_1$, a second-level threshold $T_2$ and up to the N-th threshold TN, wherein $T_1 < T_2 < \ldots < T_N$ as shown for a threshold function in FIG. 5, i.e., an increasing order.

It should be emphasized that the input-output relation shown in FIG. 5 can be both piece-wise linear or piece-wise non-linear. That is, our blanker uses an SNR-based blanker with multiple levels. The threshold function can be discrete or continuous.

If the estimated SNR is less than $T_1$, then according to the invention the sample value for the current symbol is conditioned 430 by setting it to zero. Otherwise, our method proceeds to compare 421 the estimated SNR with the second threshold $T_2$. If the estimated SNR is less than the threshold $T_2$, our method conditions the current symbol. As described below, the conditioning can change the amplitude, phase or energy of the received data symbol. Otherwise, our method proceeds to compare the estimated SNR with the threshold of the next level until either the estimated SNR is smaller than a threshold, or the N-th level threshold is reached. If the estimated SNR is larger than $T_N$, then the blanker outputs 431 the current sample without change.

Figure 6:
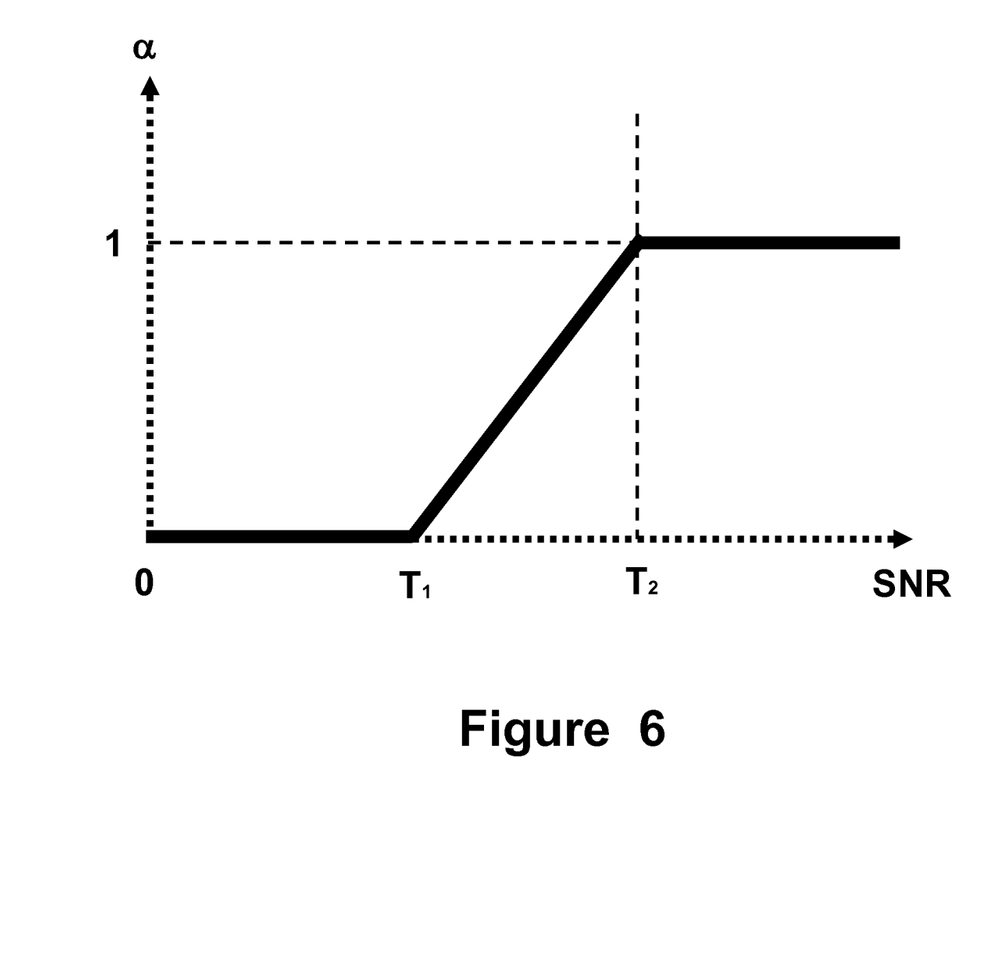
FIG. 6 is a schematic of the input-output relation of the conditioner of FIG. 4 with two-level threshold function according to embodiments of the invention.

FIG. 6 shows a particular example of FIG. 5 with a two levels threshold function, wherein the second level is larger than the first level.

In addition to the multi-threshold blanking, the SNR-based blanker can optionally also generates 450 a weighting coefficient w 511 for each data symbol. The weighting coefficients are designed to quantify a reliability of received data symbols.

For example, the log likelihood of i-th bit $S_i$ can be approximated as $$L(S_i = v) \cong k \frac{(x_i - \mu)^2}{\sigma_i^2},$$

where $\mu$ denotes the mean of the input when $S_i = v$ and $\sigma_i^2$ is the noise energy. Conventionally, it is assumed that $\sigma_i^2 = \sigma^2$ is a constant. However, in the presence of impulsive noise, $\sigma_i^2$ is time variant.

Thus, we can model $\sigma_i^2 = \sigma_T^2 + \sigma_I^2$, where $\sigma_T^2$ is the constant Gaussian noise level and $\sigma_I^2$ is the time-varying energy of the impulse noise.

The likelihood function can be expressed as $$L(S_i = v; \sigma_i^2) \cong \frac{\sigma_0^2}{\sigma_i^2} L(S_i = v; \sigma_0^2) = w_i L(S_i = v; \sigma_0^2),$$

where $W_i$ is a weighting coefficient for the i-th data symbol. The value of $w_i$ is computed based on the estimated noise level at the i-th data sample. Generally, the weight assignment function is designed such that the weight decreases as the total noise level increases.

Figure 7:
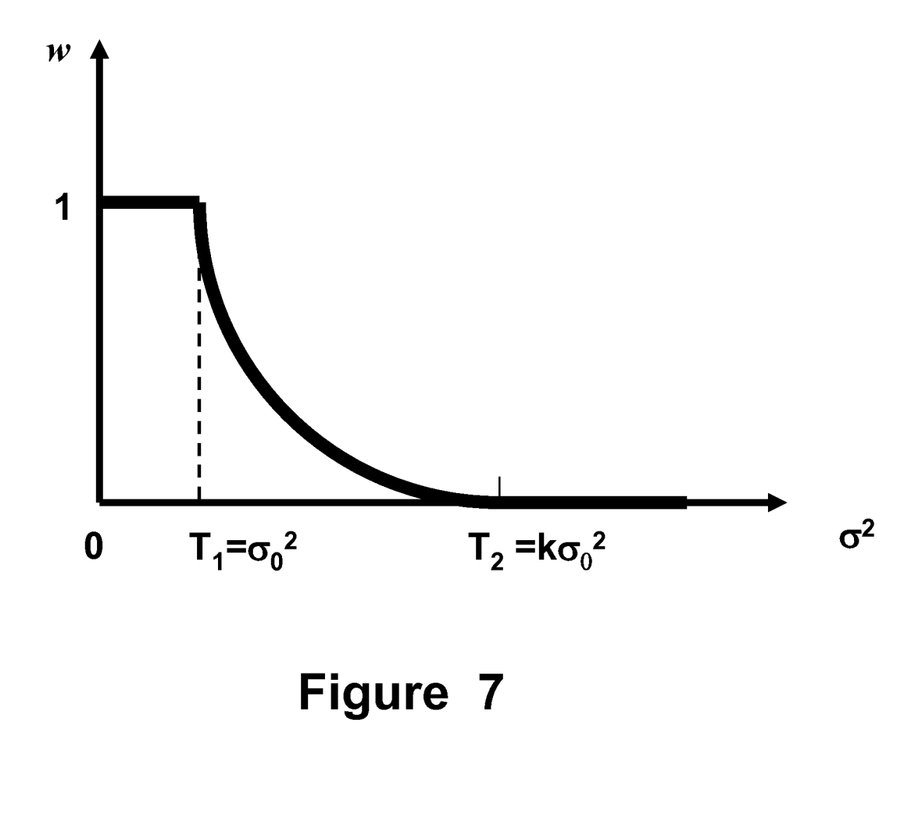
FIG. 7 is a graph of weighting coefficients as a function of SNR used by the blanker according to embodiments of the invention.

FIG. 7 shows an example of the weight assignment function given by $$w_i = \begin{cases} 1 & \sigma^2 \leq T_1 = \sigma_0^2 \\ \sigma_0^2/\sigma^2 & \sigma_0^2 < \sigma^2 < k\sigma_0^2 \\ 0 & \sigma^2 \geq T_2 = k\sigma_0^2, \end{cases}$$

where k is a constant much greater than one. For OFDM system, the $W_i$ is estimated for the entire OFDM symbol in which the bit $S_i$ belongs.

As shown in FIG. 3A, the blanker can output both the processed data samples and the weighting coefficients 511. The processed data samples are then transformed 333 into the frequency-domain via the Discrete Fourier Transform (DFT) operation.

After that, the DFT output is first de-mapped 334 to P(n), and de-interleaved 335 to Q(n). The corresponding weighting coefficients w(n) 511 obtained from the blanker is also de-interleaved 335 into $\tilde{w}(n)$. Finally, the weight $\tilde{w}(n)$ is then fed into the error correction decoder 337 and used to generate cost metrics for the decoder.

A decoder 337 example using Q(n) and $\tilde{w}(n)$ is shown in FIG. 3B in which the de-interleaved weighting coefficients $\tilde{w}(n)$ are multiplied 326 with Q(n). The resulting samples $\tilde{Q}(n) = Q(n) \times \tilde{w}(n)$ are then fed into a Viterbi decoder 328.

It is worth noting that the SNR estimation can be implemented using different methods. In one implementation, the noise level can be estimated by counting the total number of time-domain samples with energy exceeding a pre-determined threshold.

In another implementation, the blanker can estimate the noise power from the total symbol energy, when if the network employs constant-energy symbols.

For OFDM networks, the blanker can also determine the noise level based on the energy within null subcarriers over which no signals are transmitted.

Spatial-Domain Noise Reduction

Figure 10:
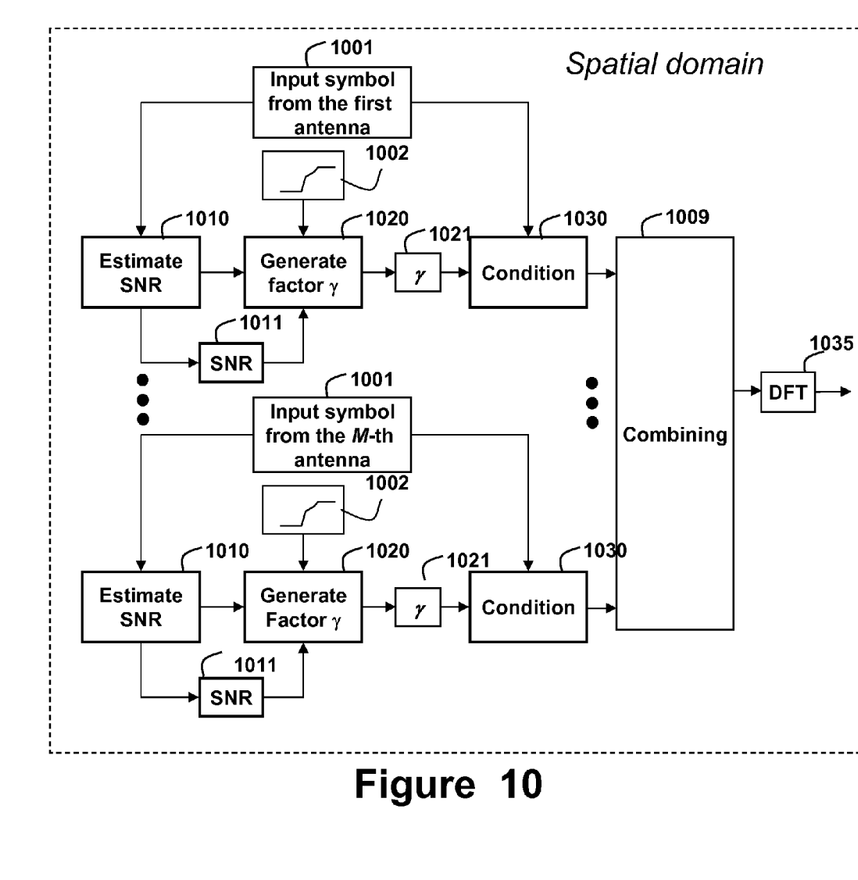
FIG. 10 is a schematic of a blanking process with multiple receive antennas according to embodiments of the invention.

If the receiver is equipped with multiple antennas, the blanking can be applied to the received signal from each antenna as shown in FIG. 10.

Here, the SNR 1011 is estimated 1010 for the input symbol 1001 from each antenna. The factors γ 1021 generated 1020 using the functions 1002. The symbols are conditioned 1030, and the combined 1009, before being passed to the DFT 1035.

Time-Domain Noise Reduction

Figure 8:
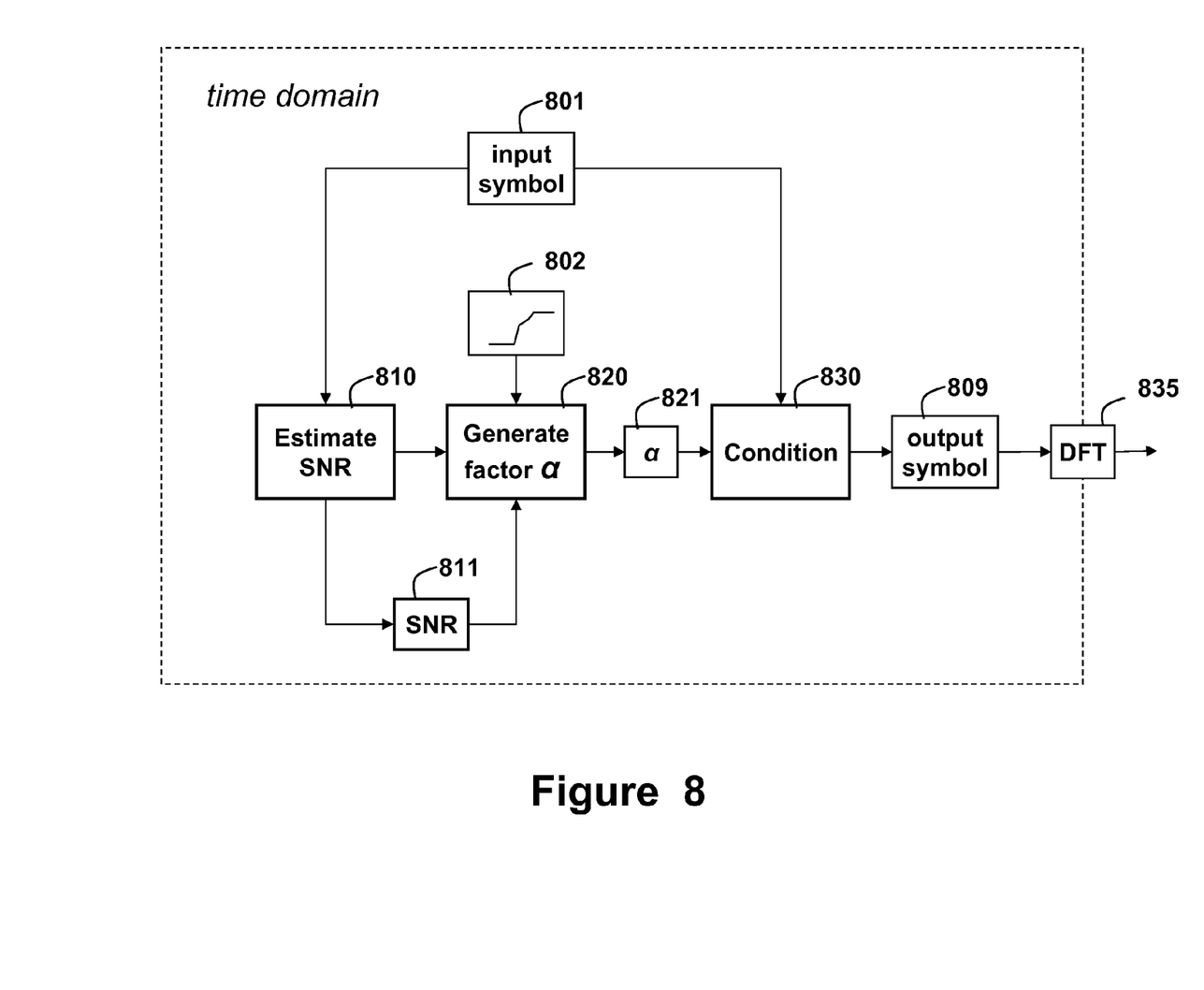
FIG. 8 is a schematic of a time-domain blanking process according to embodiments of the invention.

FIG. 8 shows the essential steps for time-domain noise reduction. The invention first uses the input symbol 801 to estimate 810 the SNR 811 and subsequently generate 820 the weighting coefficient α 821 according to the multi-level threshold function 802. After that, the symbol is conditioned 830 by α 821 before output 809 to the DFT 835.

Frequency-Domain Noise Reduction

Figure 9:
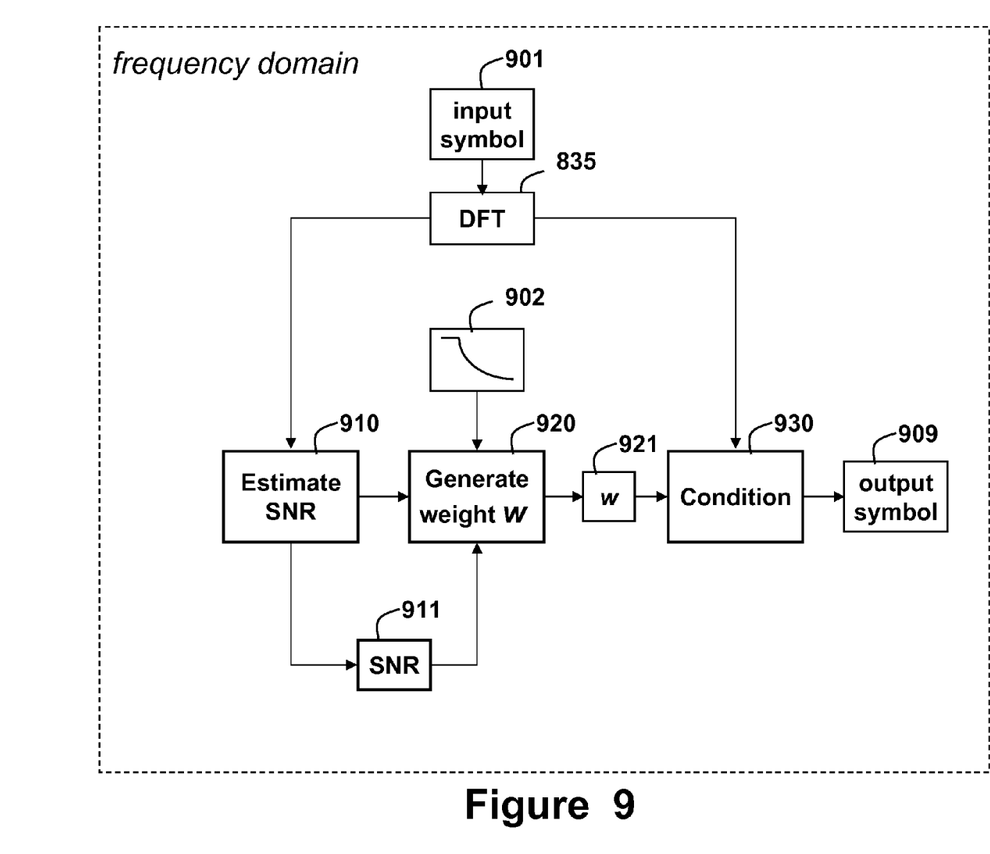
FIG. 9 is a schematic of a frequency-domain SNR-based weighted output process according to embodiments of the invention.

FIG. 9 shows the essential steps for frequency-domain noise reduction. The invention first converts each time-domain input symbol 901 into the frequency-domain via the DFT 835. After that, the frequency-domain symbol is used to generate 920 the weighting coefficient w 921 based on estimated 910 SNR 911 and a multi-level threshold function 902. Finally, the frequency-domain symbol is conditioned 930 by w before the output symbol 909 is decoded.

Combined Time and Frequency-Domain Noise Reduction

Figure 11:
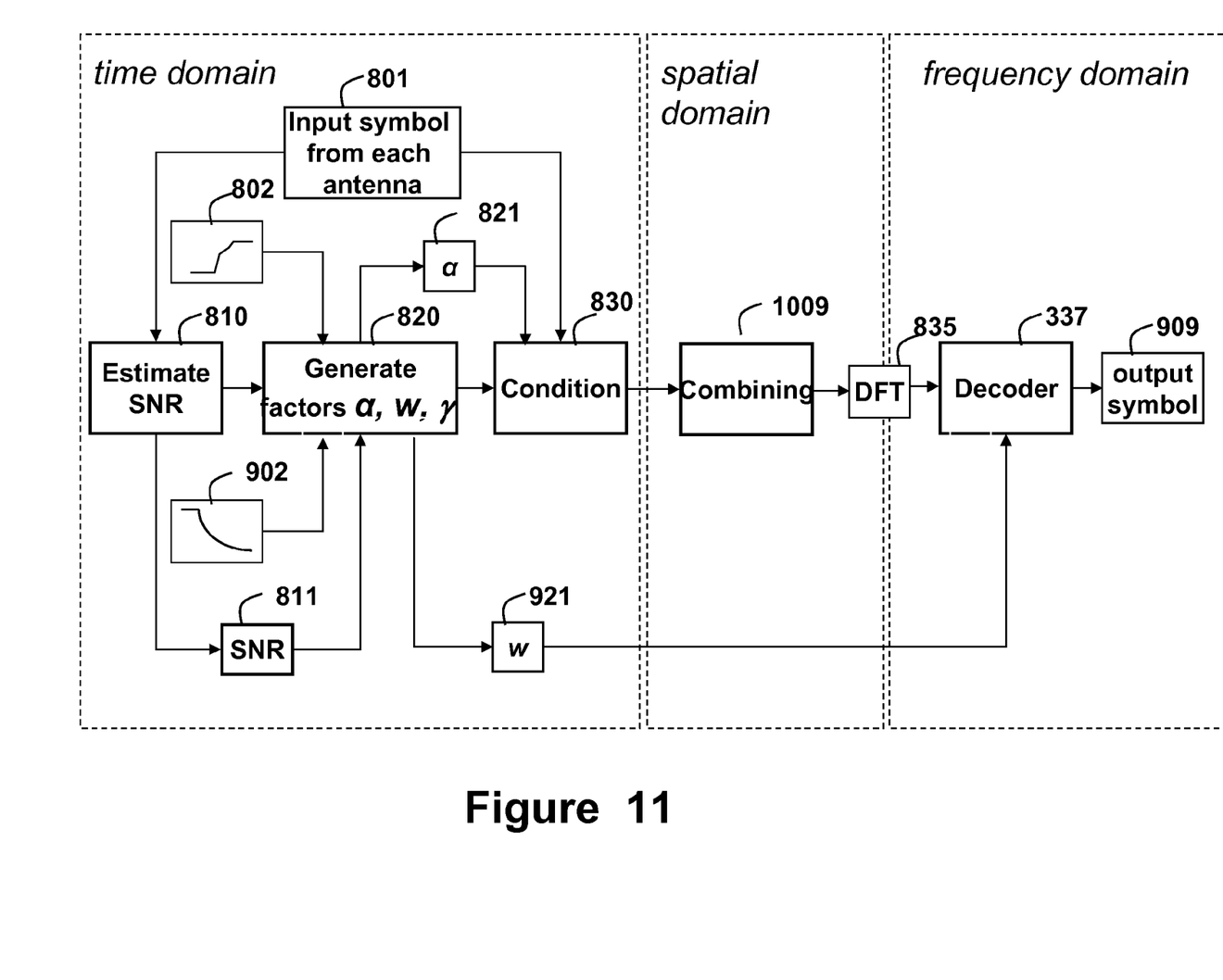
FIG. 11 is a schematic of a process including time-domain blanking, frequency-domain weighting and multiple antennas blanking/combining according to embodiments of the invention.

FIG. 11 shows a receiver wherein the time, spatial and frequency-domain noise reduction are used in combination. If there is only one receiver antenna, then we can respectively collapse either the time or frequency-domain noise reduction by setting w=1 or α=1.

Conditioning

It should be noted that the conditioning can be applied to any aspect of the data symbol signal, e.g., the amplitude, phase, or energy, or any combination therefore. The conditioning can either increase or decrease the phase or energy, or shift the phase.

EFFECT OF THE INVENTION

The invention improves the network bit-error-rate (BER) after error correction and decoding in an OFDM network, when impulsive noise is present.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for mitigating noise in symbols received via a wireless network in a receiver, comprising:
   estimating, in the receiver, a signal-to-noise ratio (SNR) of a symbol;
   conditioning the symbol in the receiver, wherein the conditioning is performed as a function of the estimated SNR, and wherein the conditioning is performed in time-domain, frequency-domain, or spatial-domain or combinations thereof, and wherein the conditioning is applied to an amplitude, phase, or energy level, or combinations thereof;
   generating a weighting coefficient w for the symbol to quantify a reliability of received data symbols, wherein a weight assignment function of the weighting coefficient is given by $$w_i = \begin{cases} 1 & \sigma^2 \leq \sigma_0^2 \\ \sigma_0^2/\sigma^2 & \sigma_0^2 < \sigma^2 < k\sigma_0^2 \\ 0 & \sigma^2 \geq k\sigma_0^2, \end{cases}$$

where k is a constant much greater than one; and
estimating the reliability, which is a log likelihood v of an i-th $S_i$ of the symbol as $$L(S_i=v;\sigma_i^2) \cong w_i L(S_i=v;\sigma_0^2),$$

where $\sigma_i^2$ is a noise energy of an i-th symbol, $\sigma_0^2$ is constant noise energy, and $w_i$, is the weighting coefficient for the i-th symbol, wherein a value of $w_i$ is based on the SNR of the i-th symbol, and $L(S_i=v,\sigma_0^2)$ is a likelihood of the value v of the symbol i-th under $\sigma_0^2$.

2. The method of claim 1, wherein the network uses orthogonal frequency division multiplexing.

3. The method of claim 1. wherein the function is continuous.

4. The method claim 1, wherein the function is discrete.

5. The method of claim 1. wherein the function is piecewise linear.

6. The method of claim 1, wherein the function is piecewise non-linear.

7. The method of claim 1, wherein noise is impulsive noise, and $\sigma_i^2$ is time variant.

8. The method of claim 1, wherein the estimating counts a total number of time-domain samples with an energy exceeding a pre-determined threshold, 9. The method of claim 1, wherein the estimating is based on a total symbol energy when the network employs constant-energy symbols.

* * * * *